United States Patent [19]

Iyeta

[11] 4,171,817
[45] Oct. 23, 1979

[54] CONTROL DEVICE FOR CONTROLLING THE MOVEMENT OF PICKUP ARM OF RECORD PLAYER OR THE LIKE

[75] Inventor: Motoi Iyeta, Hamakita, Japan

[73] Assignee: Nippon Gakki Seizo Kabushiki Kaisha, Shizuoka, Japan

[21] Appl. No.: 867,293

[22] Filed: Jan. 5, 1978

Related U.S. Application Data

[63] Continuation of Ser. No. 634,746, Nov. 24, 1975, abandoned.

[30] Foreign Application Priority Data

Nov. 25, 1974 [JP] Japan ............................ 49-135778
Nov. 25, 1974 [JP] Japan ............................ 49-135779
Nov. 25, 1974 [JP] Japan ............................ 49-135780
Nov. 30, 1974 [JP] Japan ............................ 49-137991
Dec. 3, 1974 [JP] Japan ............................ 49-139290
Feb. 19, 1975 [JP] Japan ............................ 50-20735

[51] Int. Cl.$^2$ ............................................. G11B 3/10
[52] U.S. Cl. ................................................ 274/23 R
[58] Field of Search ................... 274/23 R, 23 A, 23 B

[56] References Cited

U.S. PATENT DOCUMENTS

| 2,192,360 | 3/1940 | Mann ............................ 274/15 R |
| 3,506,269 | 4/1970 | Hannah ........................ 274/9 RA |
| 3,572,724 | 3/1971 | Rabinow ...................... 274/23 A |
| 3,926,440 | 12/1975 | Wren ........................... 274/14 |

Primary Examiner—Steven L. Stephan
Attorney, Agent, or Firm—Cushman, Darby & Cushman

[57] ABSTRACT

A control device for controlling the movement of the pickup arm of a record player or the like. This device comprises: a movable member; a motor for driving this movable member; a relative position detecting means for optically detecting the horizontal relative positions of the pickup arm and the movable member and for controlling, by the output signal of the detecting means, the direction as well as the speed of rotation of the motor to thereby cause the movable member to move while keeping a certain distance from the pickup arm; and a lifter means provided on the movable member and adapted to be actuated at a desired position of the pickup arm for lifting up this pickup arm and holding same at its uplifted positions. This control device will not be brought into mechanical connection with the pickup arm during the period other than the period during which time the device is controlling the movement of the pickup arm. And also, the pickup arm position may be detected through the detection of the position of the movable member, by the use of any desired means, without any interference in the free movement of the pickup arm. Thus, this device never interferes with the free movement of the pickup arm.

22 Claims, 13 Drawing Figures

CONTROL DEVICE FOR CONTROLLING THE MOVEMENT OF PICKUP ARM OF RECORD PLAYER OR THE LIKE

This is a continuation, of application Ser. No. 634,746 filed Nov. 24, 1975, now abandoned.

BACKGROUND OF THE INVENTION (a) Field of the Invention

The present invention concerns a control device for controlling the movement of a pickup arm of a phonograph record player, a video disc player and the like. More particularly, the present invention pertains to a control device of the type described for automatically bringing, for example, a pickup arm up to a required position above a record disc of a record player, or for automatically lifting up the pickup arm from the surface of the record disc upon competion of the playing of the disc and for causing this uplifted pickup arm to return to the predetermined rest position of the pickup arm.

(b) Brief Description of the Prior Art

There has been proposed a number of devices aimed for automatically controlling the movement of a pickup arm of a record player or the like. However, such a known control device which is adaptable for use in a record player of a high-class standard or in a record player designed for the ues of professional persons has not been successfully produced until now for the reasons as will be described below.

It can be said, in general, that a control device designed to perform an automatic control of the pickup arm movement requires means for detecting the position of the pickup arm. With known control devices, however, the position-detecting means usually is constructed of a single or plural switch means and for example a movable lever which is fixed to the supporting shaft of a supporting means of the pickup arm for horizontal swinging movement jointly with the pickup arm. In such prior art arrangement, the lever is designed to move along together with the pickup arm and to engage the switch means when the pickup arm arrives at a predetermined position, causing the switch means to perform a changeover of connection for automatic control of the pickup arm movement. It should be noted, accordingly, the reaction force of such a changeover action of the switch means tends to be applied to the pickup arm via the movable lever and also the supporting means, with the result that the free movement of the pickup arm is hampered. And also, the provision of the movable lever on the supporting shaft will give an adverse effect on the performance characteristics of the pickup arm. Furthermore, it is impossible to provide such movable lever in a high-class or professional type record player, since the pickup arm supporting means of the record player of such type has not a shaft portion which is arranged to swing in accordance with the movement of the pickup arm. This is the most important reason why the prior art control device can not be utilized for the control of a high-class record player.

Moreover, in general, means for returning the pickup arm from an arbitrary position to the rest position has to be provided on the control device to conduct the automatic control function of the pickup movement. To the prior art, however, the returning operation is usually performed by means of a motor exclusively provided for this returning of the pickup arm, and this motor is arranged to be coupled, via a transmission mechanism, to the supporting shaft which is movable jointly with the pickup arm. It should also be noted that in a high class record player is provided no supporting shaft arranged to move with the pickup arm. In such high class record player, the pickup arm is usually supported by the use of a supporting means of the so-called one-point supporting system or the so-called four-point gimbal supporting system. Therefore, the prior art arrangement is not suitable for use in a high class record player. Moreover, a known control device arrangement will, even if applied to the consumer-type record player which usually adopts a relatively simple supporting means such as the so-called two-point supporting system, give a much undesirable effect upon such performance characteristics of the pickup arm as the lower resonance frequency, the lateral balance, the inside force, the tracking error and the efficiency of inertia.

For the reasons as described above, the control device of the prior art has not been adopted in high-class record players.

On the other hand, in case a pickup arm is directly operated manually, there tends to occur accidents such that the pickup cartridge which is attached to the foremost end of the pickup arm is damaged and/or the disc record surface could be injured, through some mis-handling of the pickup arm or for like reasons. Moreover, the handling of the pickup arm is complicated and troublesome.

As such, there has been an increasing strong demand for the development of an improved control device for automatically or remotely controlling the movement of a pickup arm, which device not causing ill effects on the performance of the pickup arm.

SUMMARY OF THE INVENTION

It is, therefore, a primary object of the present invention to provide a control device for controlling the movement of a pickup arm of a record player or the like, which does not give any adverse effect on the performance of the pickup arm.

Another object of the present invention is to provide a control device of the type described above, which is arranged so that this device is brought into mechanical connection with the pickup arm only when the device is required to make the control of the movement of the pickup arm, and that the device does not have any mechanical connection with the pickup arm during any other period than the period in which the device is conducting the above-said controlling work.

A further object of the present invention is to provide a controlling device of the type described above, which functions so that the device automatically lifts up the pickup arm from the surface of a record disc upon completion of the playing of the record disc.

A still further object of the present invention is to provide a control device of the type described above, which functions so that the device detects the position of the pickup arm without having any mechanical connection with the pickup arm, and automatically causes the pickup arm to return to the rest position thereof upon completion of the playing of a record disc.

A yet further object of the present invention is to provide a control device of the type described above, which automatically brings the pickup arm onto the record disc for the playing of the record disc.

These and other objects as well as the advantages of the present invention will become apparent by reading the following detailed description of the invention

DETAILED DESCRIPTION OF THE PREFERRED EMBODIMENTS

Figure 1:
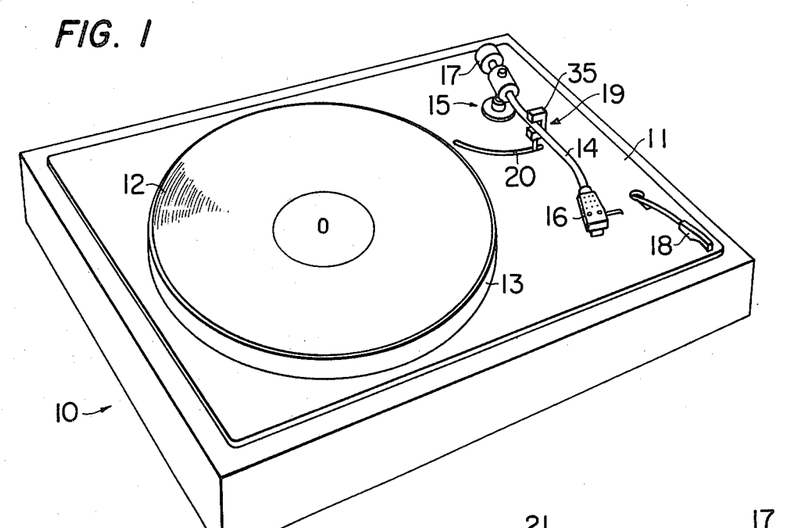
FIG. 1 is a general perspective view of a phonograph record player which employs an example of the control device according to the present invention.

Referring now to FIG. 1, there is shown a record player generally indicated by 10 which employs the pickup arm movement controlling device according to the present invention. On a board 11 is rotatably mounted a platter 13 which is adapted to rotate while carrying thereon a record disc 12. A pickup arm 14 is supported, for upward and lateral swinging movements, on a marginal portion of the board 11 by a supporting means 15. This pickup arm 14 has a pickup cartridge 16 at its forward end and also has a counterweight 17 at its base end. An operation lever 18 is provided through the board 11 so as to protrude above this board. This operation lever 18 is arranged to swing upwardly, downwardly, leftwardly and rightwardly so that it is capable of establishing the movement or the position of the pickup arm 14. It should be understood that the whole of the device for controlling the movement of the pickup arm 14 according to the present invention is hidden below the board 11. Only a part of a pickup arm lifter means generally indicated at 19 protrudes above the board 11 through a slit 20 which is formed through the board 11.

Figure 2:
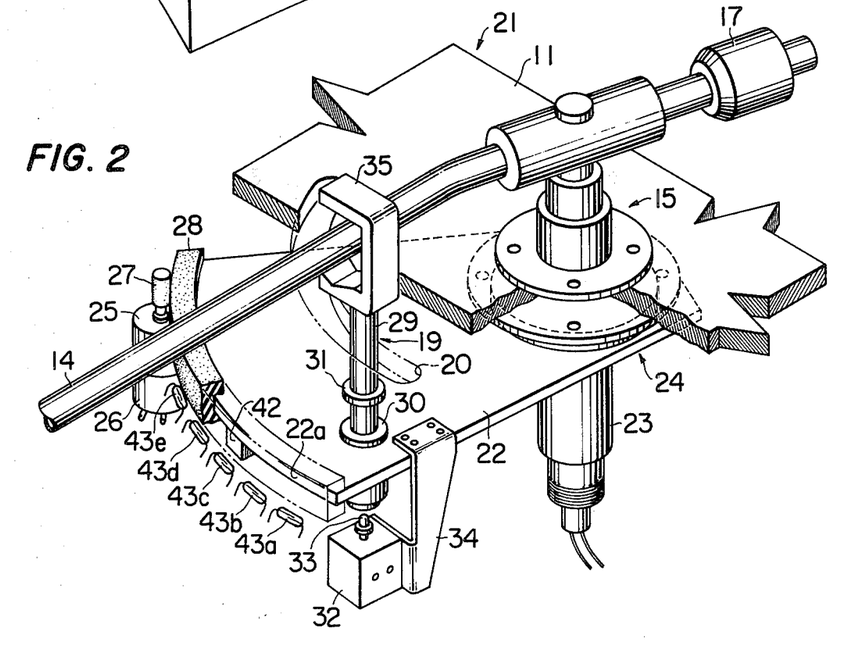
FIG. 2 is a partial perspective view showing the mechanism portion of the control device embodying the present invention.

FIG. 2 shows the mechanism of the device 21 for controlling the movement of the pickup arm 14 according to the present invention. A movable member 22 is arranged to rotate freely about a shaft 23 of the supporting means 15. For example, this movable member 22 may be formed into the shape of a sector which is swingably secured to the board 11 via an attaching member 24. The movable member 22 is moved by a motor 26 having therein a speed-reducing mechanism 25 in such a way that the movable member 22 is held always at a certain position relative to the pickup arm 14. This motor 26 is controllable in both its rotating direction and speed in accordance with the polarity and the value of the voltage applied thereto. The rotation force of the motor 26 may be transmitted to the movable member 22 by a rim-drive mechanism having a simplified arrangement which comprises a roller 27 provided on the shaft of said speed-reducing mechanism 25 and a rubber rim or a rubber-equivalent rim 28 which is attached to an arcuate edge 22a of the movable member 22 and which contacts the roller 27. Instead of such a transmitting mechanism, however, the rotation force of the motor 26 may be transmitted to the movable member 22 by a belt-pulley drive mechanism comprised of a belt and pulleys. By so arranging, it is possible to easily prevent the vibrations of the motor 26 from being transmitted to the movable member 22. Said lifter means 19 may have the structure comprising a shaft 29. The shaft 29 is secured to the movable member 22 by a thrust bearing means 30 for being able to move in the direction of the length of this shaft 29, i.e. vertically. Reference numeral 31 represents a stopper provided on the shaft 29 for limiting the downward movement of this shaft 29. That lower end portion of the shaft 29 which extends beyond the lower side of the movable member 22 is positioned to face the tip of a plunger 33 of an electromagnetic solenoid 32 which, in turn, is secured to the movable member 22 by an attachment member 34. That upper end of the shaft 29 which protrudes, through said slit 20, above this slit 20 is provided with a head 35 having a laterally opening U-shaped cross section. This head 35 has a lower wall portion 35a for engaging the pickup arm 14 to hold this arm at its up-lifted position when said solenoid 32 is actuated and when, accordingly, its plunger 33 is caused to move upwardly and when, thus, the shaft 29 of the lifter means 19 is pushed upwardly. The head 35 is provided also with a relative position detector 36 for detecting the horizontal distance (position) of the pickup arm 14 relative to the movable member 22.

The relative position detector 36 may include: a light-emitting element 37 such as a light-emitting diode or a lamp; a convex lens 38; and a photo-electricity converting element 39 such as a photo-transistor, a photo-diode or a CdS cell. The light-emitting element 37 is fixed within a hole 40 formed in the lower wall 35a of the U-shaped head 35. The convex lens 38 is fittingly received in the opening of this hole 40. The upper wall 35b of the head 35 is provided with a hole 41 formed at a position corresponding to said hole 40. Within the hole 41 is provided the photo-electricity converting element 39. The convex lens 38 has such a focal distance that the rays of light emitting from the light-emitting element 37 which pass through the lens 38 are first collected at an intermediate point P between the upper wall 35b and the lower wall 35a and that, then, the resulting beam of light impinges onto the photo-electricity converting element 39. The reason why the focal distance of the convex lens 38 is established as stated above is as follows. That is, in this example of FIGS. 2 and 3, the pickup arm 14 is required to be positioned, in this particular example, at a height substantially intermediate of the upper and the lower walls 35b and 35a of the head 35 during the periods other than the period in which the lifter means 19 holds the pickup arm 14 at its uplifted position. As such, it will be understood that, in general, the convex lens 38 does not necessarily have a focal distance which satisfies the above-discussed requirements of the particular example.

Figure 3:
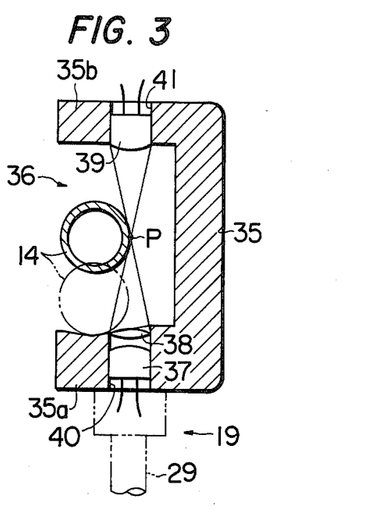
FIG. 3 is a vertical sectional view of an example of the relative position detecting means employed in the present invention.

The relative position detector 36 is arranged to be operative so that the pickup arm 14 is caused to be positioned at the point P at which the light rays emitted from the light-emitting element 37 are collected into a beam of light, i.e., at the position whereat the beam of light has the minimum diameter, and that this beam of light is diffused by the lateral side surface of the pickup arm 14, to thereby substantially greatly vary the amount of those light rays impinging onto the photo-electricity converting element 39 in accordance with the position assumed by the pickup arm 14. As such, it will be understood that, by the employment of this position detector 36, it is possible to detect, with highly enhanced sensitivity, the relative positions of both the pickup arm 14 and the movable member 22.

Figure 4:
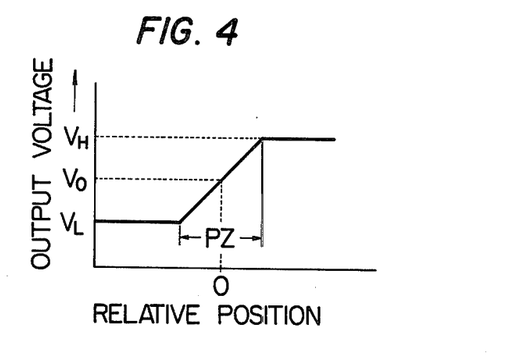
FIG. 4 is a chart showing the input-output characteristic of the relative position detecting means of FIG. 3.

FIG. 4 shows the input-output characteristic of the above-mentioned relative position detector 36, i.e., the relationship between the "input", i.e., the displacement of the pickup arm from the predetermined relative position and the "output", i.e., the output voltage (or current or impedance) of the photo-electricity converting element 39.

Let us now assume that when the movable member 22 is in a predetermined position relative to the pickup arm 14, 50% of the beam of light from the light-emitting element 37 impinges onto the photo-electricity converting element 39. If, under the above-said condition, the pickup arm 14 makes a quicker advancement toward the center of the record disc 12 than does the movable member 22, there will arise a decrease in such amount of light rays as corresponding to obstruction by the lateral side surface of the pickup arm 14. Accordingly, the amount of light rays impinging onto the photo-electricity converting element 39 will increase. As a result, the output voltage (position signal level) will incarese. However, if there is a delay of more than a predetermined level in the movement of the movable member 22 following the pickup arm 14, the light beam will eventually fully impinge onto the photo-electricity converting element 39. And, the output voltage will become constant at certain value $V_H$ and will not rise any further than this value. Also, on the contrary, if the movable member 22 advances too quickly relative to the pickup arm 14, the amount of the beam of light which is obstructed by the lateral side surface of the pickup arm 14 will increase. As a consequence, the amount of the light rays impinging onto the photo-electricity converting element 39 will decrease. As a result, the output voltage will decrease accordingly. And, if the movable member 22 makes an excessive advancement beyond a certain limit as compared with the pickup arm 14, the whole amount of the beam of light will be obstructed by the pickup arm 14. As the natural consequence, the beam of light will completely cease to impinge onto the photo-electricity converting element 39. Thus, the output voltage will become constant at a certain value $V_L$ and will not drop any further therefrom. It is to be noted that this minimum value of the output voltage is a voltage value caused by the light rays which are incident to the photo-electricity converting element 39 from external light sources, rather than the beam of light coming from the light-emitting element 37.

Figure 5:
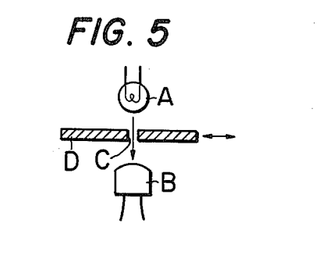
FIG. 5 is a diagrammatic illustration of another arrangement of the relative position detector.
Figure 6:
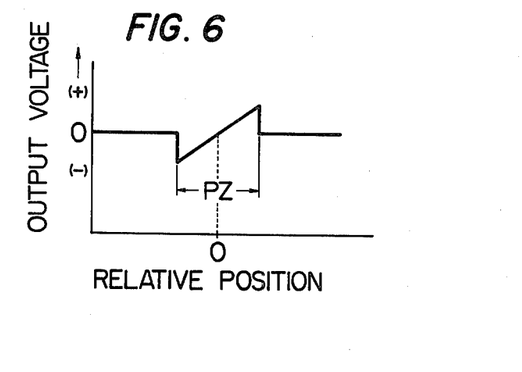
FIG. 6 is a chart showing the input-output characteristic of the relative position detecting means of FIG. 5.

The relative position detector 36 of the arrangement as stated above has numerous advantages; however, it may have such an arrangment as shown in FIG. 5. In this arrangement, the means 36 includes a slit-carrying plate D which is adapted to move horizontally jointly with the movable object which is to be detected of its position is arranged between a lamp A and a balanced bridge element B having an output voltage whose polarity as well as value vary in proportion with the variation in the position of the impinging light spot. In such a relative position detecting means, the slit-carrying plate D is located at an intermediate position, and when the light spot which has passed through the slit C of the plate D impinges onto the center, i.e. the blancing point, of the light-receiving surface of the balanced brdige element B, the output of the means will become zero. On the other hand, when the plate D has moved either toward the right side or the left side for a distance greater than a predetermined value and accordingly when the light spot has been positioned outside of the light-receiving surface of the balanced bridge element B, the output of this position detecting means will also become zero (See FIG. 6). As such, the relative position detecting means as shown in FIG. 5 can be operated only in the proportional region PZ (FIG. 6).

In contrast thereto, the position detector shown in FIG. 3 which is employed in the preceding embodiment is able to unfailingly make differentiation, by the polarity of the output voltage, as to in which direction the position of the moving object, i.e., the pickup arm 14, has dislocated from the predetermined position, even in the outside of the proportional region PZ shown in FIG. 4. Thus, the relative position detector of FIG. 3 will become disabled in no circumstances. Such an advantage of the relative position detector will very greatly contribute to the accomplishment of the purpose of detecting the relative positions of both the pickup arm 14 and the movable member 22 which are movable indpendently of each other, in the control device according to the present invention. More specifically, this contribution will be attributed to the fact that the pickup arm 14 very frequently tends to move away from the movable member 22 for a distance greater than the predetermined value, and also to the desire that such a displacement between these two members should not occur to cause the position detector 36 to become disabled in performing the required detection.

Furthermore, the relative position detector 36 having the arrangement of FIG. 3 is arranged so that the light rays are collected into a beam having a very small diameter at point P, for example a diameter of 0.1 ~ 0.5 mm, and that the position of the pickup arm 14 is detected at this point P. As such, there is the following advantage that even when the pickup arm 14 has made a slight displacement relative to said very small diameter of the beam of light at point P, the amount of the light rays which impinge onto the photo-electricity converting element 30 will vary to a substantial extent, and that, accordingly the position of the pickup arm 14 can be detected with a highly enhanced sensitivity. Such a high sensitivity of detection is not obtained easily from the position detecting means as shown in FIG. 5.

Also, in FIG. 2, a permanent magnet 42 is attached to the lower surface of the movable member 22. Below this magnet 42, there are arranged reed switches 43a, 43b, 43c and 43d of the normally closed type and a reed switch 43e of the normally open type at predetermined intervals relative to each other for the purpose of detecting the position of the pickup arm. These reed switches 43a, . . ., 43e will be rendered "on" or "off" as the movable member 22 moves and as, accordingly, the magnet 42 provided thereunder approaches the switches. By the on-off action of the reed switches, the position of the movable member 22 is detected. These reed switches 43a, . . ., 43e will become necessary in case it is intended to have the record player 10 perform automatic operation by the control device of the present invention.

Hereinbelow will be made a brief explanation of the basic behavior of the control device of the present invention. Let us now assume that the record player 10 is in its midst of performance, and that the pickup arm 14 is at an arbitrary position on a record disc 12 carried on the platter 13. Let us also assume that, at an arbitrary time, the movable member 22 is located at a predetermined position relative to the pickup arm 14, and that accordingly the relative position detector 36 is outputting an output voltage $V_o$. Needless to say, during the period of performance of the record player 10, the solenoid 32 is held in its de-actuated state. And, the lifter means 19 is in its lowered position, and the head 35 thereof is not in engagement with the pickup arm 14. Under the above-stated conditions, let us assume that the pickup arm 14 moves for a slight distance toward the center of the record disc 12 in accordance with the rotation of the record disc. In other words, when the pickup arm 14 moves toward the left side in FIG. 3, the output voltage of the relative position detector 36 increases beyond $V_o$. Whereupon, the motor 26 is caused to rotate in the forward direction, and accordingly the movable member 22 is caused to rotate toward the center of the record disc 12. As the movable member 22 thus reaches a predetermined position relative to the pickup arm 14, the output voltage of the relative position detector 36 will drop to $V_o$ and the rotation of the motor 26 will cease. In this way, the movable member 22 moves in pursuance to the pickup arm 14, and these two members 22 and 14 will always keep a certain constant relative positional relationship.

Accordingly, by causing the lifter means 19 to make an upward movement by actuating the solenoid 32, the pickup arm 14 is lifted up by the lower wall 35a of the head 35 of this lifter means 19, and thus the pickup cartridge 16 can be detached apart from the surface of the palying record disc 12. In such a manner as stated above, the performance of the record player 10 can be interrupted as the pickup arm 14 is lifted upwardly by controlling the actuating current of the solenoid 32, without directly touching the pickup arm 14 by the user's finger. It should be noted here that, during the playing performance of the record player, the relative position detector 36 and the lifter means 19 are movable without engagement with the pickup arm 14, and therefore the pickup arm 14 is never prevented from its free movements.

The control device of the present invention should be understood to be able to control the movement of the pickup arm 14 in various manners other than that described above. This fact will be made clear from the following explanation.

Figure 7:
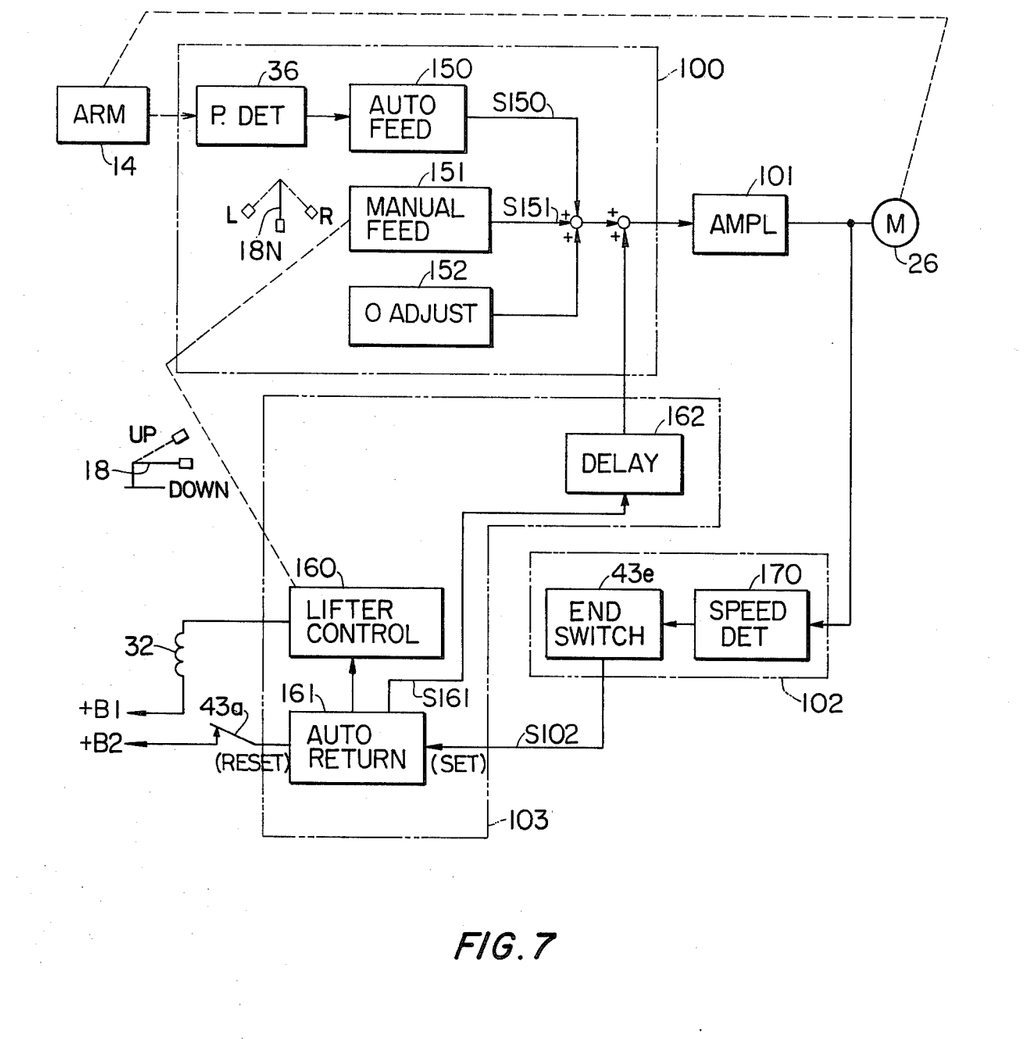
FIG. 7 is a block diagram showing an example of the circuitry of the control device according to the present invention.

FIG. 7 shows an example of the control circuit employed in the control device according to the present invention. This control circuit makes it possible: to perform remote control of the movement of the pickup arm 14 by the manual operation of the operation lever 18; to perform automatic stop operation of automatic uplifting of the pickup arm 14 from the surface of the record disc 12 upon completion of the playing of the record disc 12; and to perform automatic quick return operation by automatically returning, at a high speed, the pickup arm 14 to the rest position thereof after automatically lifting up the pickup arm 14 from the surface of the record disc 12, upon completion of the play of the record disc 12.

This control circuit can be divided roughly into an input circuit 100, a power amplifier 101, an end detecting circuit 102, and an automatic quick return circuit 103. The input circuit 100 includes an automatic tracing signal generating circuit 150 which recevies, an an input, the output voltage of the relative position detector 36 and generates an automatic tracing signal S150 of the negative polarity corresponding to the output voltage of the position detector 36. More specifically, when the movable member 22 lags from the pickup arm 14, and when accordingly the output voltage of the relative position detector 36 increases by an amount $+\Delta V$ from the value $V_o$ shown in FIG. 4, the automatic tracing signal generating circuit 150 will generate an automatic tracing signal of the negative polarity which is proportional to said $+\Delta V$. However, there is no need of paying consideration to an instance wherein the movable member 22 advances faster than moves the pickup arm 14. Therefore, it should be understood that, even in case the output voltage of the relative position detector 36 drops below the value $V_o$ which is shown in FIG. 4, the automatic tracing signal S150 is maintained at zero volt and its polarity will never become positive. The input circuit 100, on the other hand, includes a manual feeding signal generating circuit 151. This manual feeding signal generating circuit 151 generates a manual feeding signal S151 of either the positive or the negative polarity corresponding to the operation of the operation lever 18 which protrudes above the board 11 of the record player 10. For example, in case the operation lever 18 is fixed in the frontal direction (meaning: at the neutral position) of the record player 10 casing, the manual feeding signal S151 is of zero volt. When the operation lever 18 is lifted obliquely upwardly and is swung in the clockwise direction, the manual feeding signal S151 will be a voltage of the negative polarity and of a value substantially proportional to the angle of swing of the lever 18. When the operation lever 18 is swung in the counter-clockwise direction, the manual feeding signal S151 will have a voltage of the positive polarity and of a value substantially proportional to the angle of swing of the lever 18.

Furthermore, the input circuit 100 includes a zero adjuster circuit 152 which generates a faint voltage for cancelling the faint manual feeding signal 151 which might be generated by the circuit 151 when the operation lever 18 is fixed in said neutral position, and for, thereby, keeping this signal S151 at substantially zero.

The automatic quick return circuit 103 includes a lifter-actuating circuit 160, a quick return signal generating circuit 161, and a delay circuit 162.

The lifter-actuating circuit 160 is assigned to deliver an actuating current to the solenoid 32, when the operation lever 18 is swung from its neutral position to an upward position and also when the quick return signal generating circuit 161 generates a quick return signal S161.

The quick return signal generating circuit 161 may include a latching relay. When the quick return signal generating circuit 161 receives an end signal from the end detecting circuit 102 and when accordingly said latching relay is set, there is generated a quick return signal S161 from the circuit 161. This signal S161 is delivered, via the delay circuit 162, to the input circuit 100. This quick return signal S161 is a voltage of the positive polarity and of a value which is relatively large.

When the permanent magnet 42 which is provided on the under side of the movable member 22 is positioned immediately above the reed switch 43a of the normally closed type and when thus this reed switch 43a breaks and when accordingly the latching relay of the quick return signal generating circuit 161 is re-set, this circuit 161 ceases to generate the quick return signal S161. Symbols +B1 and +B2 represent voltage source, respectively.

The end detecting circuit 102 may include said reed switch 43e and a speed detecting circuit 170. Upon completion of the playing of the record disc 12, the pickup arm 14 is rapidly swung toward the center of the record disc 12 while being led by a lead-out groove of a large pitch of the record disc 12. At the same time therewith, the movable member 22 which moves while following up the pickup arm 14 is caused to move at a high speed toward the center of the record disc 12. As such, it should be understood that, at the time of completion of the performance, the voltage applied to the motor 26 which is assigned to drive the movable member 22 will have a very large value. This increase in the voltage applied to the motor 26 is detected by the speed detecting circuit 170, and this circuit 170 generates an end signal S102. And, at the time the performance is ended, the magnet 42 is positioned just above the reed switch 43e of the normally open type, and this switch 43e is closed. Accordingly, the generated end signal S102 is delivered, via the reed switch 43e, to the quick return signal generating circuit 161. Even in the event that the applied voltage of the motor 26 should increase for some reasons or other in the midst of playing, the reed switch 43e is held open and, therefore, there never occurs the mishap that an end signal S101 is delivered by mistake.

Next, explanation will be made of the behavior of the control device according to the present invention in which is employed the aforesaid control circuit.

Let us now assume that the pickup arm 14 is located at its rest position. At such a time, the pickup arm 14 is mounted on the lower wall 35a of the head 35 of the lifter means 19. Furthermore, this lifter means 19 is in its lowered position. Also, the reed switch 43a is in its open state, having received the magnetic flux of the magnet 42 which is located just above the reed switch 43a. The operation lever 18, on the other hand, is in its pushed-down state at its neutral position.

Under the above-stated condition of the members, the operation lever 18 is swung upwardly. Whereupon, the lifter-actuating circuit 160 is actuated to deliver an actuating current to the solenoid 32. Accordingly, the plunger 33 of this solenoid 32 is lifted upwardly to move the lifter means 19 upwardly. Therefore, the pickup arm 14 is lifted up, while being supported by the lower wall 35b of the head 35 of the lifter means 19.

Thereafter, the operation lever 18 is swung clockwise. Whereupon, the manual feeding signal generating circuit 151 generates a manual feeding signal S151 of the negative polarity. This manual feeding signal S151 is inputted to the power amplifier 101. The output of this power amplifier 101 is applied to the motor 26. Whereby, the motor is caused to rotate in the forward direction. As a result, the movable member 22 is caused to rotate clockwise, i.e. toward the center of the record disc 12. The pickup arm 14 which is held at its up-lifted position by the lifter means 19 is thus caused to move toward the center of the record disc 12. Thus, at the time when the pickup cartridge 16 which is attached to the foremost end of the pickup arm 14 has reached above the lead-in groove of the record disc 12, the operation lever 18 is returned to its neutral position, causing the delivery of the manual feeding signal S151 from the manual feeding signal generating circuit 151 to be suspended to thereby stop the rotation of the motor 26, and thus the movement of the movable member 22 ceases. And, when the operation lever 18 is swung downwardly to suspend the supply of the actuating current to the solenoid 32 from the lifter-actuating circuit 160, the plunger 33 of the solenoid 32 will gently descend due to the braking action received from, for example, a viscous liquid enclosed within the solenoid 32. Thus, the lifter means 19 moves gently toward a lower position. As a result, the pickup arm 14 is caused to make a soft landing onto the record disc 12. During this part of operation, the pickup arm 14 is positioned between the upper and the lower walls 35b and 35a of the head 35 as shown in FIG. 3, and there no longer is the mechanical engagement between the pickup arm 14 and the head 35 of the lifter means 19. At such time also, both the pickup arm 14 and the movable member 22 are at predetermined relative positions. Accordingly, there is generated no automatic tracing signal S150 from the automatic tracing signal generating circuit 150.

As the pickup arm 14 makes a displacement progressively toward the center of the record disc 12 by being led by the lead-in groove or the signal groove of the turning record disc 12, this displacement is detected by the relative position detector 36. Whereby, there is generated an automatic tracing signal S150 of the negative polarity from the automatic tracing signal generating circuit 150. This signal S150 is inputted to the power amplifier 101. As a result, the motor 26 is rotated in the forward direction, and the movable member 22 is swung toward the center of the record disc 12. In this way, the movable member 22 automatically follows up the pickup arm 14.

When the playing of the record disc 12 ends, the pickup arm 14 is caused to make a quick swinging and displacing movement toward the center of the record disc 12 while being led by the large-pitched lead-out groove of the disc 12. This sudden large displacement of the pickup arm 14 is detected by the relative position detector 36. The automatic tracing signal generating circuit 150, thereby, inputs to the power amplifier 101 an automatic tracing signal S150 of the negative polarity and of a large value. As a result, a large voltage is applied to the motor 26, causing the motor 26 to make a high speed rotation in the forward direction. Whereby, the movable member 22 is caused to be swung quickly toward the center of the record disc 12. Also, the speed detecting circuit 170 receives a large voltage of the positive polarity which has been applied to the motor 26, and it outputs an end signal S102. At this point of time, the permanent magnet 42 is positioned above the reed switch 43e, and this reed switch 43e is closed. As such, the end signal S102 which is generated from the speed detecting circuit 170 is delivered out through the closed reed switch 43e.

As the quick return signal generating circuit 161 receives said end signal S102, the latching relay of this circuit 161 is set, and accordingly the circuit 161 generates a quick return signal S161 and along therewith the circuit 161 delivers an actuating signal to the lifter-actuating circuit 160. Upon receipt of this actuating signal, the lifter-actuating circuit 160 delivers an actuating current to the solenoid 32, causing the plunger of the solenoid 32 to move upwardly. Thus, the pickup arm 14 is lifted up from the surface of the record disc 12 by the lifter means 19 associated with the solenoid 32. The quick return signal S161 delivered from the quick return signal generating circuit 161 is delayed by the delay circuit 162, and after the pickup arm 14 has been lifted up above the record disc 12, the delayed quick return signal S161 is inputted to the power amplifier 101. As a result, a large voltage of the negative polarity is applied to the motor 26. Whereupon, the motor is rotated at a high speed in the reverse direction, causing the movable member 22 to swing counter-clockwise at a high speed. When the pick-up arm 14 which has been lifted up and carried along by the lifter means 19 provided on the movable member 22 returns to its rest position, the permanent magnet 42 is positioned above the reed switch 43a and this reed switch 43a is opened. Whereby, the supply of electric current to the latching relay of the quick return signal generating circuit 161 is cut off. Accordingly, the latching relay is re-set. Thus, the quick return signal generating circuit 161 ceases the generation of the quick return signal S161 and, along with this, the circuit 171 suspends the supply of the actuating signal to the lifter-actuating circuit 160. Accordingly, the lifter-actuating circuit 160 shuts off the supply of the actuating current to the solenoid 32. Thus, the lifter means 19 makes a gentle descent. Needless to say, the motor 26 is at rest. In this way, the pickup arm 14 is held, in its rest position, by the head 35 of the lifter means 19.

Figure 8:
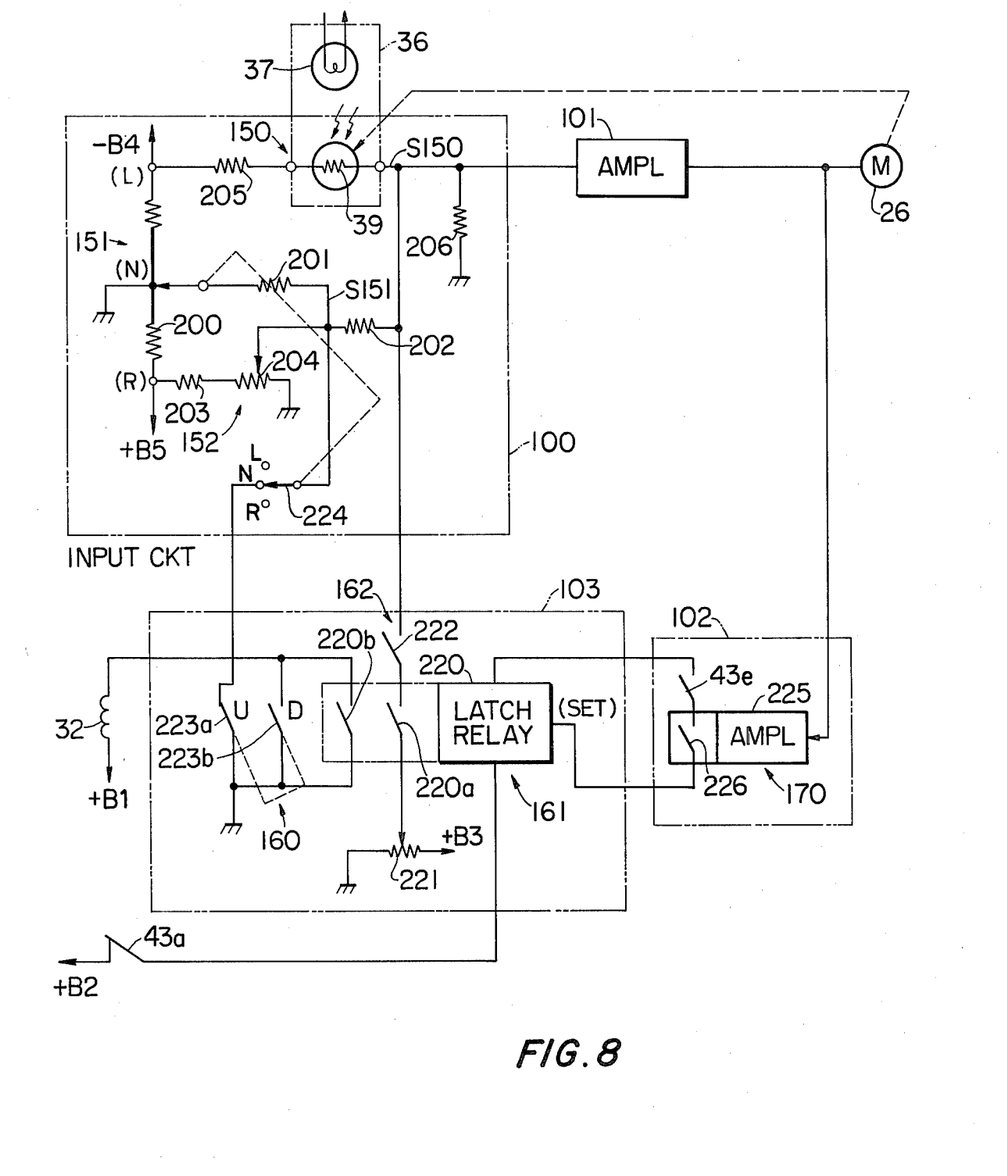
FIG. 8 is an electric circuit diagram showing an example of the concrete circuitry of the control device of FIG. 7.

FIG. 8 shows a concrete example of the control circuit of FIG. 7. A potentiometer 200 constitutes the manual feeding signal generating circuit 151. The two terminals of this potentiometer 200 are connected to the plus voltage source +B5 and the minus voltage source −B4, respectively. Furthermore, the slider tap of this potentiometer 200 is adapted to be moved by the operation lever 18. Said manual feeding signal S151 appears at this slider tap. This signal S151 is inputted to the power amplifier via resistors 201 and 202. The series connection of a resistor 203 and a potentiometer 204 constitutes said zero adjuster circuit 152. The zero adjusting signal which appears at the slider tap of the potentiometer 204 is inputted to the power amplifier via the resistor 202. The series connection of the photo-electricity converting element 39, such as a photo-diode, of the relative position detector 36 and resistors 205 and 206 constitutes said automatic tracing signal generating circuit 150. The automatic tracing signal S150 which appears at the junction point of the resistor 206 and the photo-diode 39 is inputted directly to the power amplifier 101.

Figures 10, 13:
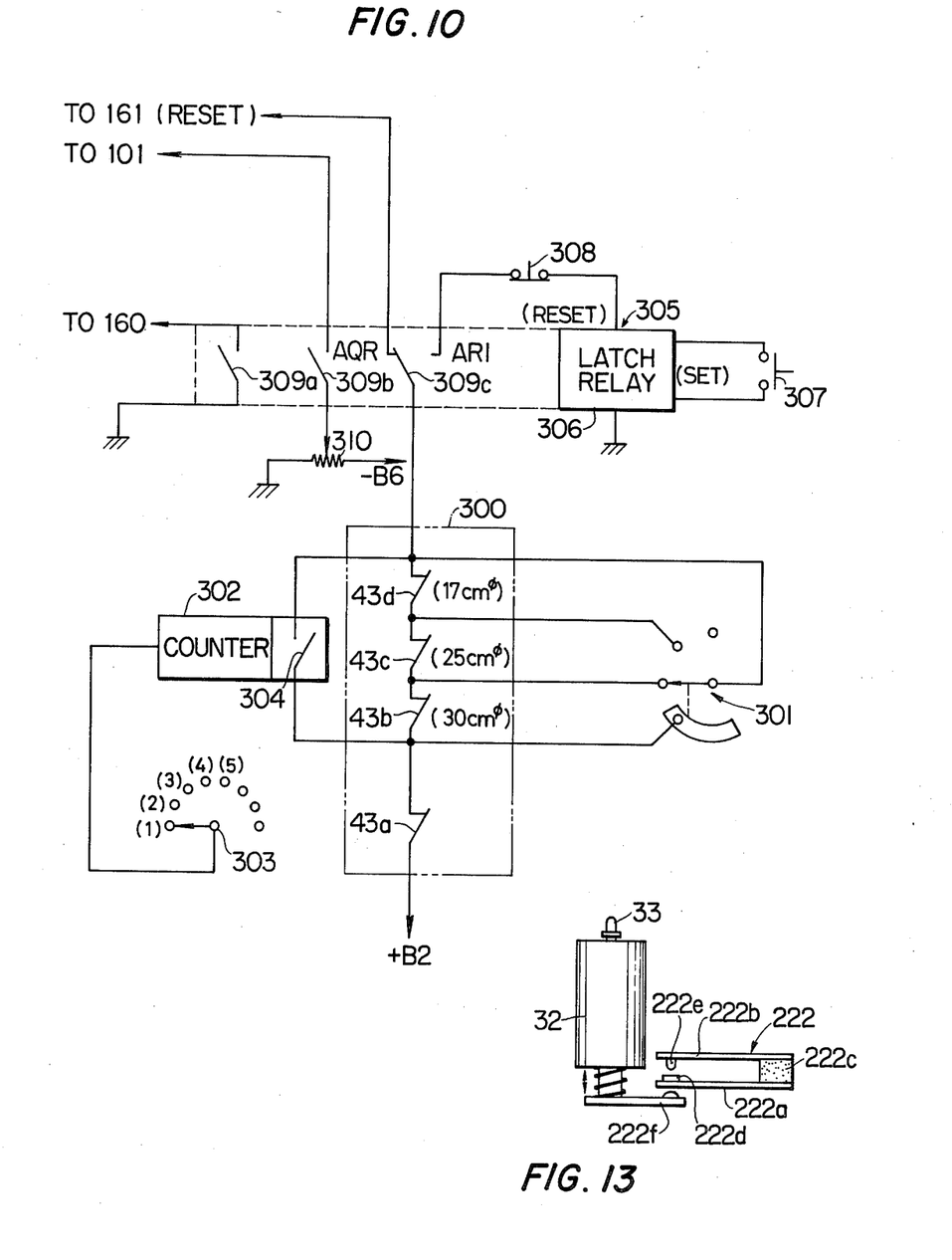
FIG. 10 is an electric circuit diagram showing an example of the concrete circuitry of the control device of FIG. 9.
FIG. 13 is an explanatory illustration of an example of a switch means which is adapted to close when the lifter means of the device has moved upwardly.

A latching relay 220 and a potentiometer 221 constitutes said quick return signal generating circuit 161. The potentiometer 221 is connected to a voltage source +B3 of the positive polarity. The voltage of the positive polarity which appears at the slider tap of this potentiometer 221 is delivered, as said quick return signal S161, to said delay circuit 162 via the first contact 220a of the latching relay 220. Said delay circuit 162 includes a switch 222 which closes when the plunger 33 of the solenoid 32 has ascended to the topmost position. An example of this switch 222 is shown in FIG. 13. On the inner surfaces of the free ends of two elastic conductive pieces 222a and 222b which are arranged to face each other via an insulating spacer 222c, there are provided contacts 222d and 222e, respectively. A plate 222f which is secured to the lower end of the plunger 33 of the solenoid 32 is arranged to project below the free end of one 222d of the conductive pieces of the switch 222. When the solenoid 32 is actuated and when accordingly the plunger 33 has moved substantially up to the top position, the conductive piece 222d is pushed up by the plate 222f, and the contacts 222d and 222e are brought into contact with each other. Mutually interlocked switches 223a and 223b, and the second contact 220b of the latching relay 220 constitute said lifter actuating circuit 160. These switches 223a and 223b are operated by the operation lever 18. The switch 223b is connected in parallel with the contact 220b, and this parallel connection is connected in series to the solenoid 32. The switch 223a is connected to the input terminal of the power amplifier 101 via a three-contact type switch 224 which is changed over of its connection by the swinging operation of the operation lever 18 and via the resistor 202. This switch 223a is provided so that it is closed when the operation lever 18 is swung downwardly in its neutral position to thereby cause the input terminal of the power amplifier 101 to be grounded. Thus, this switch 223a may be omitted.

The end detecting circuit 102 is constituted by a series circuit formed with said reed switch 43e, and a relay contact 226 which is actuated by the output of an amplifier 225 to which is inputted the output of the power amplifier 101.

It should be understood that the respective switches and relay contacts in FIG. 8 show the respective state in which the operation lever 18 is pushed downwardly in its neutral position, and in which the pickup arm 14 is at rest in its rest position.

Figure 9:
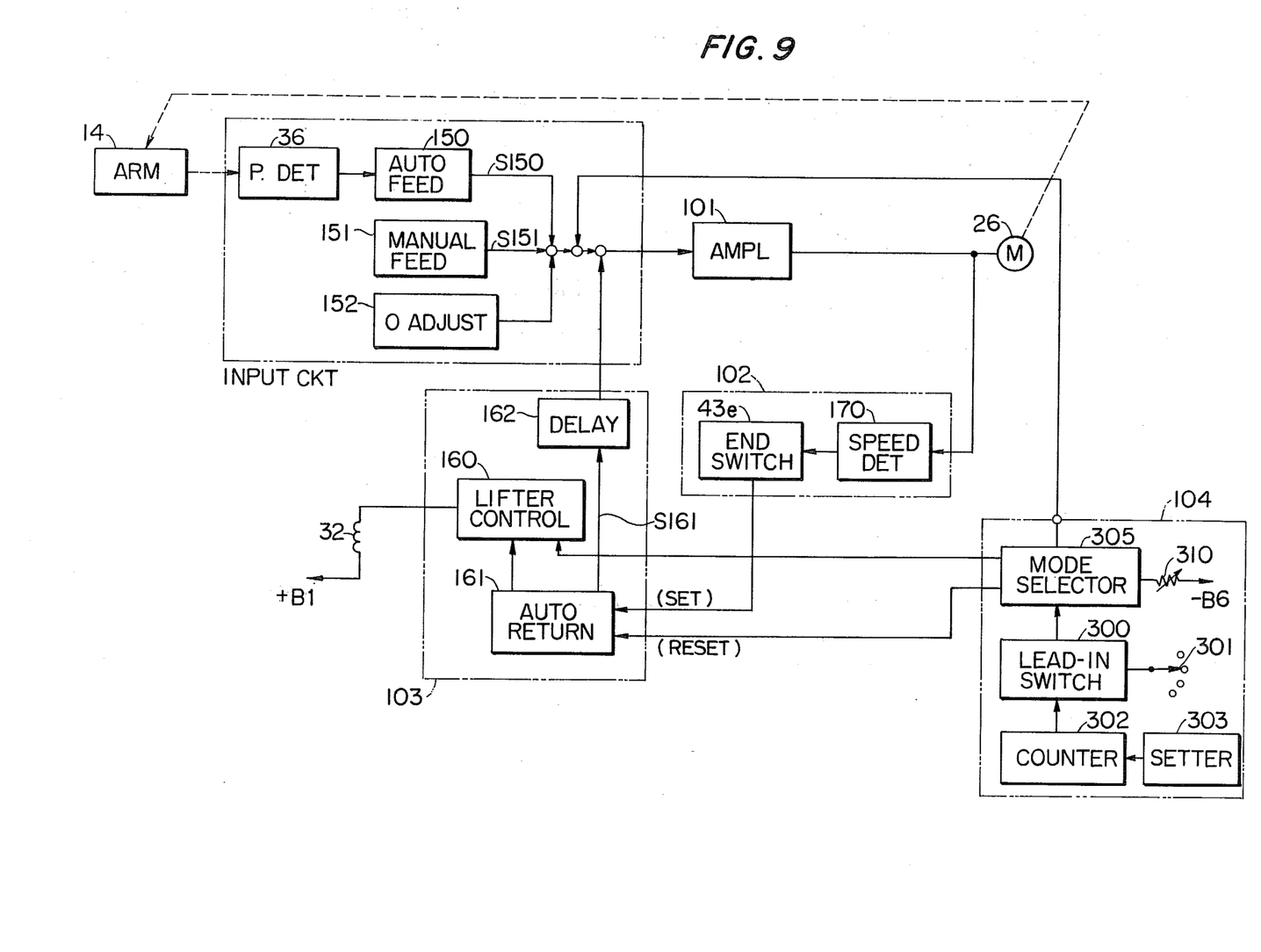
FIG. 9 is a block diagram showing another example of the control circuit according to the present invention.

FIGS. 9 and 10 show another example of the control circuit of the control device according to the present invention. This control circuit further includes a circuit unit 104. According to this control circuit, there can be attained, in addition to the functions accomplished by the control circuit of FIG. 7, the following further functions: that is, the automatic lead-in operation function of automatically identifying the size of the record disc 12 and of automatically moving the pickup arm 14 to a position just above the lead-in groove of the record disc 12; and the automatic repeating operation function of automatically repeating the playing performance of the record disc 12 only up to a required number of times.

The circuit unit 104 includes a lead-in position detecting circuit 300 for detecting the lead-in groove of the record disc 12 of the different sizes (17 cm, 25 cm or 30 cm) when conducting said automatic lead-in operation and said automatic repeating operation. This lead-in position detecting circuit 300 is constructed of a series-connected reed switches 43e, 43b, 43c and 43d. Those reed switches 43b, 43c and 43d are shorted selectively by a record size setting switch 301. The circuit unit 104 also includes a counter 302 which counts the number of repeating times during said automatic repeating operation. This counter 302 comprises a relay contact 304 which is closed by the output of the counter 302 which is delivered when the counter 302 counts the number of repeating times of the play and when the counted value reaches the value of count set by a setter 303 of the number of repeating times. This relay contact 304 is connected in parallel with the entirety of the reed switches 43b, 43c and 43d. Furthermore, the circuit unit 104 includes an operation mode selecting circuit 305 for changing over the operation mode between said automatic lead-in operation (including the automatic repeating operation also) and said automatic quick return operation. This operation mode selecting circuit 305 comprises a latching relay 306. This latching relay 306 is set by the making action of a switch 307 of the normally open type and is re-set by the breaking action of another switch 308 of the normally closed type. The latching relay 306 has two normally open type contacts 309a and 309b and a change-over contact 309c. The contact 309a is connected in parallel with the switch 223b shown in FIG. 8. One of the terminals of the contact 309b is connected to the slider tap of a potentiometer 310, and the other use of the terminals is connected to the input terminal of the power amplifier 101. This potentiometer 310 is intended to set the velocity with which the pickup arm 14 is brought to a position above the lead-in groove of the record disc 12 from the rest position of the arm 14. Symbol −B6 represents a voltage source of negative polarity. The normally closed terminal of the contact 309c is connected to the latching relay 220 of the quick return signal generating circuit 161. And, the normally open terminal of the contact 309c is connected to the switch 308. Also, the movable terminal of the contact 309c is connected to the lead-in position detecting circuit 300.

Next, description will be made of the behavior of the control device according to the present invention employing the control circuit shown in FIGS. 9 and 10.

Let us now assume that the pickup arm 14 is at its rest position. The switch 307 is closed to set the latching relay 306. Whereupon, the contact 309a and 309b are made. Also, the movable terminal of the contact 309a is connected to its normally open terminal. Accordingly, the solenoid 32 is actuated, causing the lifted means 19 to ascend. Thus, the pickup arm 14 is lifted up, and at the same time therewith, the voltage of negative polarity which appears at the slider tap of the potentiometer 310 is inputted to the power amplifier 101 via the contact 309b, and the motor 26 is caused to rotate in the forward direction. As a result, the movable member 22 is caused to swing clockwise toward the center of the record disc 12. Thus, the pickup arm 14 is brought toward the center of the disc 12 while being held by the lifter means 19. Let us assume that the record disc 12 is, for example, a 30 cm record disc and that the reed switches 43c and 43d are shorted by the record size setting switch 301. When the pickup arm 14 has reached a position above the lead-in groove of the record disc 12 and when the permanent magnet 42 has reached a position above the reed switch 43b, the reed switch 43b is opened and, accordingly, the latching relay 306 is re-set. As a result, the contacts 309a and 309b are opened, and the solenoid 32 is de-actuated, so that the lifter means 19 is caused to descend gently. Along therewith, the pickup arm 14 makes a soft landing onto the record disc 12. Also, the slider tap of the potentiometer 310 is switched over of its connection from the input terminal of the power amplifier 101. In this way, the playing of the record player is started. During this part of operation, the connection of the contact 309c has already been changed over, and the lead-in position detecting circuit 300 has already been connected to the quick return signal generating circuit 161.

When, after the completion of the playing, the pickup arm 14 makes a quick movement toward the center of the record disc 12 while being led by the lead-out groove of the record disc 12, there is generated an end signal S102 from the end detecting circuit 102. Along therewith, the quick return signal generating circuit 161 generates a quick return signal S161. And, the lifter actuating circuit 160 actuates the solenoid 32. As a result, the motor 26 is caused to rotate in the reverse direction at a high speed, causing the movable member 22 to be swung counterclockwise at a high speed. Thus, the pickup arm 14 is returned at a high speed toward its rest position while being lifted up by the lifter means 19. At the same time therewith, the counter 302 makes one count. In case the number of counts does not reach the counts set by the setter 303 assigned for setting the number of repeating times, or in other words, in case the counts do not reach the number of repeating times, the switch 304 will remain in its open state.

As such, when the pickup arm 14 returns up to the position above the lead-in groove of the record disc 12 and when the permanent magnet 42 arrives at a position above the reed switch 43b, the reed switch 43b is opened, causing the latching relay 220 of the quick return signal generating circuit 161 to be re-set. Accordingly, the quick return signal S161 ceases to be generated. Also, the solenoid 32 is de-actuated, and the lifter means 19 makes a slow Thus, the pickup arm 14 makes a soft landing again onto the record disc 12. In case the pickup arm 14 is subjected to quick returning after the playing of the record disc 12 has been repeated for a number of times set by the setter 303, it will be noted that, since the switch 304 is made thereby shorting the reed switches 43b, 43c and 43d, the pickup arm 14 is returned to its rest position and it stays there. With this, the automatic repeating operation completes.

It should be understood that, in the state of operation wherein the switch 308 is opened and the latching relay 306 is re-set, it is possible to move the pickup arm 14 by operating the operation lever 18. In such instance also, said automatic quick return operation is performed.

Figure 11:
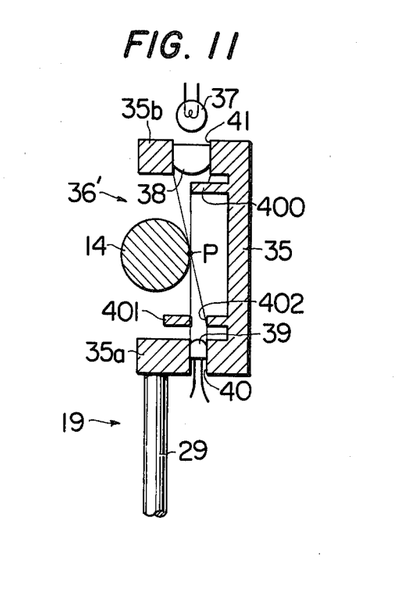
FIG. 11 is a vertical sectional view of a modification of the position detecting means employed in the present invention.

FIG. 11 shows still another embodiment of said relative position detector 36. In this example, the light-emitting element 37 and the convex lens 38 are provided on the upper wall 35b of the head 35, and the photo-electricity converting element 39 is provided on the lower wall 35a of the head 35. A light-shutter plate 400 covering substantially one right half of the convex lens 38 is provided below this lens 38. Also, a light-shutter plate 401 having a round hole 402 therethrough is provided above the photo-electricity converting element 39. In this modified position detector 36' of the instant example, the beam of light emitting from the light-emitting element 37 passes through that portion of the convex lens 38 which is not covered by the light-shutter plate 400. After these light rays are collected at point P, the beam of light is then diverged. The resulting light rays pass through the hole 402 and impinge onto the photo-electricity converting element 39. The mode of operation that the pickup arm 14 is detected of its position at the height of the point P is similar to the instance of the relative position detector 36 shown in FIG. 3.

Figure 12:
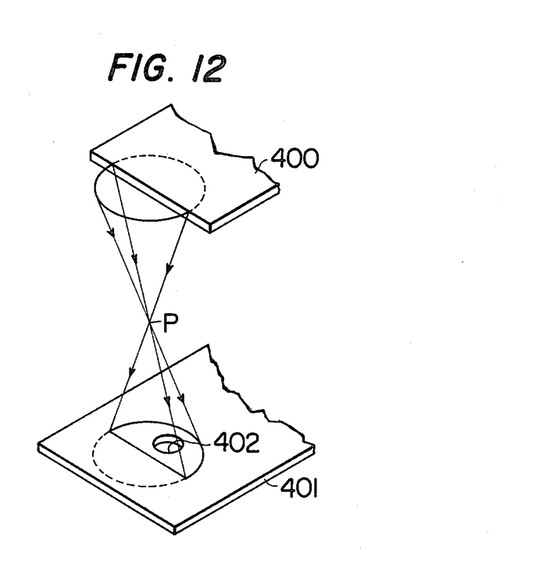
FIG. 12 is an explanatory illustration of the function of the relative position detecting means of FIG. 11.

This relative position detector 36' possesses all of the features of the position detector 36 shown in FIG. 3. In addition to these features, the relative position detector 36' of this instant example has the advantage described below. That is, since substantially one half of the convex lens 38 is covered by the light-shutter plate 400, the beam of light emitting from the light-emitting element 37 passes through the course as shown in FIG. 12 and reaches the photo-electricity converting element 39. More particularly, the beam of light is not allowed to diffuse toward the left side in FIG. 11 in the region below the point P. Therefore, even in case the pickup arm 14 makes a downward displacement due to, for example, the warping of the record disc 12, the amount of light rays which impinge onto the photo-electricity converting element 39 hardly undergoes any change. Therefore, there is the advantage that only the horizontal displacement of the pickup arm can be unfailingly detected. It should be noted that, by selecting the type of the elements 37 and 38 so as to be able to use a beam of infra-red rays or a beam of farther located infra-red rays as the beam of light, it is possible to avoid the effect due to the external light sources.

In the examples described above, the relative position detector 36 is incorporated within the head 35 of the lifter means 19. However, this relative position detector 36 may be provided at a site other than on the head 35. Furthermore, the relative position detector 36 need not be arranged so as to directly detect the displacement of the pickup arm 14. For example, there may be provided a member which is adapted to make a horizontal swinging movement jointly with the pickup arm 14, and the displacement of this member may be detected.

Also, in the examples described above, the lifter means 19 concurrently serves as the means for resting the pickup arm 14. There may be provided, however, an independent rest means. Still furthermore, the relative position detector 36 is not limited to an optical arrangement, but it may be of, for example, a magnetic type arrangement utilizing a Hall element and a magnet. Moreover, the position detecting switches for detecting the pickup arm position through the detection of the movable member position may be replaced by any switching means such as mechanically operable type switches.

I claim:

1. A pivotable tracking device for controlling the movement of a pivotable tracking arm of a record player or the like, the arm making a tracking movement in a predetermined course, comprising:
    said tracking arm;
    a movable member movable independently of said arm and movable along the course of movement of the arm;
    means for supporting said arm for freely swinging movement horizontally and vertically about horizontal and vertical axes;
    means for mounting said movable member for freely swinging pivotable movement about the vertical axis of the horizontal swing of said arm along the tracking course of movement of said arm without mechanically contacting said arm;
    a motor having a rotary shaft whose direction of rotation is controllable in accordance with the polarity of a voltage signal applied to said motor;
    a motive power transmitting means coupling said movable member for transmitting the rotation force of said motor to the movable member for attaining the movement of the movable member;
    a relative position detector for detecting the relative positions of both the arm and the movable member with respect to each other and for generating a position signal corresponding to the relative displacement of said member and arm from a predetermined relative position with respect to each other;
    a lifter means provided on said movable member and movable in a vertical direction, from a rest position to a lift position holding said arm at an uplifted position;
    a first means for causing said lifter means to move upwardly at an arbitrary time; and
    a second means for supplying a voltage signal having a polarity associated with said position signal to said motor, whereby said motor drives, via said transmitting means, said movable member, enabling said movable member to follow the movement of the arm.

2. A control device according to claim 1, in which:
    said relative position detector is provided integrally on said lifter means.

3. A controlling device according to claim 1, in which:
    said lifter means includes a shaft attached to said movable member for vertical movements and a head provided on said shaft and having a portion engaging said tracking arm when said shaft is caused to ascend, and in which:
    said first means includes a solenoid and a plunger adapted to be moved upwardly by said solenoid when the latter is actuated,
    the tip of said plunger facing the lower end of said shaft of said lifter means.

4. A control device according to claim 1, in which:
    said second means includes a power amplifier for driving said motor and an automatic tracing signal generating circuit for receiving said position signal to generate an automatic tracing signal of a first polarity and to input this signal to said power amplifier;
    said first polarity of said automatic tracing signal is such a polarity that the power amplifier will apply to said motor, when said automatic tracing signal is inputted to said power amplifier, such a voltage that said motor is rotated in a first direction by which the movable member is moved toward the center of a record disc or the like which is to be traced by a pickup cartridge provided on said pickup arm.

5. A control device according to claim 1, further comprising: an operation lever for being manually operated for remotely controlling the movement of said tracking arm; and a third means for supplying a voltage of a certain polarity and a certain value in accordance with the position assumed by said operation lever, and in which:
    said first means is associated with said operation lever for inhibiting the ascension of said lifter means when said operation lever is in its first position and for causing the lifter means to ascend when said operation lever is in its second position, and in which:
    said third means is associated with said operation lever to suspend the supply of a voltage to said motor when said operation lever is in its said first and said second positions, and to supply a voltage of a first polarity to said motor when said operation lever is in its a third position, and to supply to said motor a voltage of a second polarity which is the opposite of said first polarity when said operation lever is in its a fourth position.

6. A control device according to claim 5, in which:
said third means comprises: a power amplifier, a positive voltage source, a negative voltage source and a potentiometer consisting of a resistance element connected between said two voltage sources, and a slider tap which is slidable while being in ohmic contact with said resistance element,
said slider tap being mechanically connected to said operation lever for sliding along said resistance element in correspondence to the position assumed by the operation lever,
the voltage appearing at said slider tap being inputted to said power amplifier.

7. A control device according to claim 5, further comprising:
a fourth means for detecting the arrive of said pickup arm onto a position above a lead-out groove of a record disc which groove is to be traced by a pickup cartridge attached to the pickup arm and for generating a signal representing the completion of the playing performance of the record player to be delivered to said first means, the fourth means comprising a sensor and an actuator for said sensor, one of the sensor and the actuator being arranged on said movable member, and the other of them being located at a position, to the vicinity of which arrives said one of the sensor and the actuator when the pickup arm arrives at the position above said lead-out groove,
said first means, upon receipt of said playing performance completion signal, causing said lifter means to ascend independently of the position assumed by said operation lever.

8. A control device according to claim 7, in which:
said fourth means includes an amplifier which, using as the input the voltage applied to said motor, generates said playing performance completion signal.

9. A control device according to claim 7, in which:
said actuator is a magnet provided on said movable member and said sensor is a reed switch provided at a position to the vicinity of which said magnet arrives when said pickup arm arrives at a position above said lead-out groove of the record disc and adapted to close upon receipt of a magnetic flux emitted from this magnet,
said reed switch being inserted in series in a path through which said playing performance completion signal passes.

10. A control device according to claim 7, in which:
said first means includes a solenoid, a plunger adapted to be moved upwardly by said solenoid when an actuating current is caused to flow to said solenoid to thereby cause the ascension of said lifter means, a first voltage source, a first switch connected in series to said solenoid and said voltage source, and a latching relay having a contact connected in parallel with said first switch,
said first switch being mechanically coupled to said operation lever and adapted to open when said operation lever is positioned at its said first position and to close when said operation lever is caused to be at any of its said second, third and fourth positions,
said latching relay being rendered to its set state upon receipt of said playing performance completion signal from said fourth means to make said a contact.

11. A control device according to claim 7, further comprising:
a fifth means for detecting the presence of said pickup arm on a rest position located outside said record disc and for generating a rest position signal,
said first means causing said lifter means to descend when said operation lever is in its said first position and when this first means receives said rest position signal from said fifth means when said first means has not received said playing performance completion signal, and
a sixth means for receiving said playing performance completion signal and for delivering a pickup arm returning voltage to said motor,
said pickup arm returning voltage having a certain polarity which is required for the motor to rotate in a direction by which said movable member is caused to move toward said rest position from the center of said record disc.

12. A control device according to claim 11, in which:
said fifth means includes a magnet provided on said movable member, a reed switch provided at a position to the vicinity of which said magnet arrives when said pickup arm arrives at said rest position and adapted to break upon receipt of a magnetic flux emitted from said magnet, and a voltage source connected in series to said reed switch,
the terminal voltage of said voltage source being delivered, as said rest position signal, to said first means via said reed switch.

13. A control device according to claim 11, in which:
said first means includes a solenoid, a plunger adapted to be moved upwardly by this solenoid when an actuating current is caused to flow to said solenoid, a first voltage source, a first switch connected in series to said solenoid and said voltage source, and a latching relay having a first contact connected in parallel with said first switch,
said first switch being mechanically coupled to said operation lever and adapted to break when this operation lever is in its said first position and to make when the operation lever is in any of its said second, third and fourth positions,
said latching relay being rendered to its set state upon receipt of said playing performance completion signal from said fourth means to thereby make said first contact.

14. A control device according to claim 13, in which:
said sixth means includes a voltage generating means for generating a voltage as said pickup arm returning signal, and a second contact of said latching relay of the first means,
said second contact being connected in series in a line assigned for supplying to said motor said voltage generated by said voltage generating means,
said second contact being closed when said latching relay is in the set state,
said second contact being adapted to open when said latching relay, upon its receipt of said rest position signal from said fifth means, is rendered to its set state.

15. A device for controlling the movement of a pickup arm of a record player or the like, the pickup arm making a reciprocal movement in a predetermined course, comprising:

means for supporting said pickup arm so that said pickup arm may swing freely both vertically and horizontally about a vertical and a horizontal axis line;

a movable member movable independently of said pickup arm and movable along the course of movement of the pickup arm;

said movable member having an arcuate edge extending about said center axis line;

means for supporting said movable member for freely swinging movement about the vertical axis line of the horizontal swing of said pickup arm;

a motor having a rotary shaft whose direction of rotation is controllable in accordance with the polarity of a voltage signal applied to said motor;

a motive power transmitting means coupling said motor to said movable member for transmitting the rotation force of said motor to the movable member for attaining the movement of the movable member including a rim secured along said arcuate edge and a roller coupled to the rotary shaft of said motor for contacting said rim;

a relative position detector for detecting the relative positions of the pickup arm and the movable member with respect to each other and for generating a position signal corresponding to the relative displacement of said member and arm from a predetermined relative position with respect to each other;

a lifter means provided on said movable member and movable in a vertical direction from a rest position to a lift position holding said pickup arm at an uplifted position;

a first means for causing said lifter means to move upwardly at an arbitrary time; and a second means for supplying a voltage signal having a polarity associated with said position signal to said motor, whereby said motor drives, via said transmitting means, said movable member, enabling said movable member to follow the movement of the pickup arm.

16. A device for controlling the movement of a pickup arm of a record player or the like, the pickup arm making a reciprocal movement in a predetermined course, comprising:

a movable member movable independently of said pickup arm and movable along the course of movement of the pickup arm;

a motor having a rotary shaft whose direction of rotation is controllable in accordance with the polarity of a voltage signal applied to said motor;

a lifter means provided on said movable member and movable in a vertical direction from a rest position to a lift position holding said pickup arm at an uplifted position;

a motive power transmitting means coupling said motor to said movable member for transmitting the rotation force of said motor to the movable member for attaining the movement of the movable member;

a relative position detector provided integrally on said lifter means for detecting the relative positions of the pickup arm and the movable member with respect to each other and for generating a position signal corresponding to the relative displacement of said member and arm from a predetermined relative position with respect to each other including a light-emitting element and a photo-electricity converting element facing said light-emitting element via a space for converting to an electric signal the amount of the light rays emitted by said light-emitting element and impinging onto said photo-electricity converting element after passing through said space, said pickup arm crossing a first point within said space defined between said light-emitting element and said photo-electricity converting element when said movable member and said pickup arm are in predetermined relative positions and when said lifter means is in a position not uplifted by said lifter means;

a first means for causing said lifter means to move upwardly at an arbitrary time; and a second means for supplying a voltage signal having a polarity associated with said position signal to said motor, whereby said motor drives, via said transmitting means, said movable member, enabling said movable member to follow the movement of the pickup arm.

17. A control device according to claim 16, in which:

said relative position detector further includes a lens for collecting the light rays emitted from said light-emitting element into a small region containing a second point in the vicinity of said first point, and in which:

a part of the light rays emitting from said light-emitting element is obstructed by said pickup arm as said part of light rays passes through said small region and the non-obstructed remainder of the light rays impinges onto the photo-electricity converting element.

18. A control device according to claim 17, in which:

said photo-electricity converting element is a photo-resistor whose resistance varies in accordance with the amount of light rays received.

19. A control device according to claim 18, further comprising a power amplifier for driving said motor, and in which:

said second means includes a voltage source, and a voltage divider consisting of a first resistor and said photo-resistor connected in series to said first resistor for dividing the voltage applied by said voltage source to input the divided voltage to said power amplifier.

20. A device for controlling the movement of a pickup arm of a record player or the like, as it moves along a course of movement, comprising:

a movable member independent of said pickup arm and provided so as to be movable without mechanically engaging said arm along the course of movement of the pickup arm;

a motor;

a motive power transmitting means coupling said motor to said movable member for transmitting the rotation force of the motor to said movable member after converting said rotation force to a force for causing the movable member to move;

a relative position detector for detecting the relative positions of the pickup arm and the movable member with respect to each other and for generating a position signal corresponding to a displacement from a given reference position with respect to each other;

a lifter means provided on said movable member for holding said pickup arm in an up-lifted position when this lifter means is moved upwardly;

first means for detecting the presence of said pickup arm above a lead-in groove of a record disc which is to be traced by a pickup cartridge attached to this pickup arm and for generating a lead-in position signal;

second means having a start switch for continuously generating, when this start switch is actuated, a first signal for up-lifting said lifter means until receipt of said lead-in position signal, and for also generating a lead-in voltage to be applied to said motor;

said lead-in voltage being of such polarity that, when this lead-in voltage is applied to said motor, it will cause said movable member to be moved by said motor toward the center of said record disc from a pickup arm rest position located outside of said record disc;

third means for causing said lifter means to ascend following receipt of said first signal and throughout the period that this third means is receiving said first signal assigned for up-lifting said lifter means; and fourth means for supplying to said motor, during the period in which said lifter means is not ascended by said third means, a voltage associated with said position signal delivered from said position detector and thereby for causing said movable member to move toward the center of the record disc from said lead-in groove of this disc so as to cause said movable member to keep said given reference position relative to said pickup arm.

21. A control device according to claim 20, further comprising:

a fifth means for detecting the arrival of said pickup arm on the lead-out groove of said record disc and for generating a playing performance completion signal, and in which:

said third means is adapted to cause said lifter means to ascend upon receipt of said playing performance completion signal.

22. A control device according to claim 21, further comprising:

a counter for counting the number of times that the pickup arm arrives at said lead-out groove of said record disc;

a count setter for setting the number of counts by which said counter generates its output;

sixth means for stopping the action of said second means upon receipt of said output of the counter;

seventh means for generating a pickup arm returning voltage upon receipt of said playing performance completion signal and delivering this voltage to said motor, said motor being rotated, upon receipt of said pickup arm returning voltage, in a direction by which said movable member is caused to move toward the pickup arm rest position from the center of said record disc, and eighth means for detecting the presence of said pickup arm at its said rest position and for generating and delivering to said seventh means a signal for stopping the generation by said seventh means of said pickup arm returning voltage.

* * * * *